United States Patent
Matsuo et al.

(10) Patent No.: US 11,391,234 B2
(45) Date of Patent: Jul. 19, 2022

(54) VARIABLE VALVE CONTROL DEVICE, VARIABLE VALVE CONTROL SYSTEM, AND METHOD FOR CONTROLLING VARIABLE VALVE MECHANISM

(71) Applicant: Hitachi Astemo, Ltd., Hitachinaka (JP)

(72) Inventors: Nobuhiko Matsuo, Isesaki (JP); Hirokazu Shimizu, Isesaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/647,443

(22) PCT Filed: Sep. 18, 2018

(86) PCT No.: PCT/JP2018/034371
§ 371 (c)(1),
(2) Date: Mar. 13, 2020

(87) PCT Pub. No.: WO2019/106913
PCT Pub. Date: Jun. 6, 2019

(65) Prior Publication Data
US 2020/0277914 A1  Sep. 3, 2020

(30) Foreign Application Priority Data
Nov. 29, 2017  (JP) .............................. JP2017-228678

(51) Int. Cl.
*F02D 41/26*     (2006.01)
*F01L 1/344*     (2006.01)
(Continued)

(52) U.S. Cl.
CPC ............ *F02D 41/263* (2013.01); *F01L 1/344* (2013.01); *F02D 13/0207* (2013.01); *F02D 41/1401* (2013.01)

(58) Field of Classification Search
CPC .... F02D 41/263; F02D 41/222; F02D 41/009; F02D 41/1401; F02D 13/0234;
(Continued)

(56) References Cited

U.S. PATENT DOCUMENTS

2002/0162535 A1 * 11/2002 Machida .................. F01L 1/34
                                                          123/406.45
2004/0107041 A1    6/2004 Kobayashi et al.
(Continued)

FOREIGN PATENT DOCUMENTS

JP   2004-190662 A   7/2004
JP   2006-70754 A    3/2006
(Continued)

OTHER PUBLICATIONS

International Preliminary Report on Patentability (PCT/IB/326, PCT/IB/338 & PCT/IB/373) issued in PCT Application No. PCT/JP2018/034371 dated Jun. 11, 2020, including English translation of document C2 (Japanese-language Written Opinion (PCT/ISA/237) previously filed on Mar. 13, 2020) (seven (7) pages).
(Continued)

*Primary Examiner* — George C Jin
(74) *Attorney, Agent, or Firm* — Crowell & Moring LLP

(57) ABSTRACT

In a variable valve control device, a variable valve control system and a method for controlling a variable valve mechanism according to the present invention, An ECM (201) transmits a phase detection value (RA1) computed based on a crank angle signal (CRANK) and a cam angle signal (CAM) to a VTC control unit (202) via a communication network (211), and VTC control unit (202) computes a phase detection value (RA2) based on a motor angle signal (MAS), controls a variable valve timing mechanism (114) based on phase detection value (RA2) in the transient state of an internal combustion engine, and controls variable valve
(Continued)

timing mechanism (114) based on phase detection value (RA1) in the steady state of the internal combustion engine.

12 Claims, 12 Drawing Sheets

(51) Int. Cl.
   *F02D 13/02* (2006.01)
   *F02D 41/14* (2006.01)

(58) Field of Classification Search
   CPC .............. F02D 13/0239; F02D 13/02; F02D 2200/101; F02D 2041/001; F01L 2820/032; F01L 2800/00; F01L 1/344; F01L 2201/00; F01L 2800/12
   See application file for complete search history.

(56) References Cited

U.S. PATENT DOCUMENTS

| | | | |
|---|---|---|---|
| 2005/0211207 A1* | 9/2005 | Urushihata | F01L 1/34 123/90.17 |
| 2006/0042579 A1* | 3/2006 | Izumi | F01L 1/022 123/90.17 |
| 2009/0255510 A1 | 10/2009 | Mashiki et al. | |
| 2015/0377091 A1* | 12/2015 | Kajiura | F01L 25/08 123/90.11 |
| 2016/0252022 A1 | 9/2016 | Shinozaki et al. | |
| 2016/0348603 A1* | 12/2016 | Mikawa | F02D 41/222 |
| 2017/0074179 A1 | 3/2017 | Mikawa | |
| 2018/0045088 A1* | 2/2018 | Urushihata | F02D 41/009 |
| 2018/0051645 A1* | 2/2018 | Mikawa | F02D 13/0238 |
| 2020/0072097 A1* | 3/2020 | Koo | F01L 13/0015 |

FOREIGN PATENT DOCUMENTS

| | | |
|---|---|---|
| JP | 2015-81562 A | 4/2015 |
| JP | 2015-166587 A | 9/2015 |
| JP | 2016-160840 A | 9/2016 |
| JP | 2017-75539 A | 4/2017 |

OTHER PUBLICATIONS

International Search Report (PCT/ISA/210) issued in PCT Application No. PCT/JP2018/034371 dated Dec. 18, 2018 with English translation (five (5) pages).

Japanese-language Written Opinion (PCT/ISA/237) issued in PCT Application No. PCT/JP2018/034371 dated Dec. 18, 2018 (three (3) pages).

Extended European Search Report issued in Appl. No. 1884274.4 dated Jul. 23, 2021 with English translation (9 pages).

\* cited by examiner

VARIABLE VALVE CONTROL DEVICE, VARIABLE VALVE CONTROL SYSTEM, AND METHOD FOR CONTROLLING VARIABLE VALVE MECHANISM

TECHNICAL FIELD

The present invention relates to a variable valve control device, a variable valve control system, and a method for controlling a variable valve mechanism and, more specifically, relates to a technique to control the variable valve mechanism in which a rotation phase of a camshaft with respect to a crankshaft is varied by a rotation of a motor.

BACKGROUND ART

A vehicle control system described in Patent Document 1 at least includes: an actuator control ECU (electronic control unit) configured to control an actuator that operates synchronously with a crank angle of a vehicle; a sensor ECU connected to an in-vehicle communication network, which is the same network as the actuator control ECU, and configured to receive, as inputs, a crank signal and a cam signal of the vehicle; and timing determination means.

In the vehicle control system described above, the sensor ECU includes: crank angle calculation means configured to calculate the crank angle based on the cam signal and the crank signal; and crank angle transmission means configured to transmit the crank angle calculated by the crank angle calculation means to the timing determination means via the network.

The timing determination means here is provided in any ECU connected to the in-vehicle communication network and configured to determine timing of operation of the actuator based on the crank angle. The actuator control ECU includes timing control means configured to control the actuator based on the timing determined by the timing determination means.

REFERENCE DOCUMENT LIST

Patent Document

Patent Document 1: JP 2004-190662 A

SUMMARY OF THE INVENTION

Problem to be Solved by the Invention

In a feedback control of a variable valve mechanism in which a rotation phase of a camshaft with respect to a crankshaft is varied by a rotation of a motor, information on a detection value of the rotation phase is required.

The rotation phase is detected based on a crank angle signal, which is an output signal from a crank angle sensor, and a cam angle signal, which is an output signal from a cam angle sensor.

Here, when an electronic control device configured to control the variable valve mechanism receives, as inputs, the crank angle signal and the cam angle signal copied by another electronic control device to detect the rotation phase, a copy circuit and an input circuit for the copied signal are required, and thus, problems of increase in cost and size of a control system arise.

In addition, when the electronic control device configured to control the variable valve mechanism acquires the detection value of the rotation phase computed by another electronic control device via a communication network such as CAN (Controller Area Network), controllability may be lowered due to communication delay.

In view of such circumstance of the related art, it is an object of the present invention to provide a variable valve control device, a variable valve control system, and a method for controlling a variable valve mechanism, which have sufficient controllability with a simple configuration.

Means for Solving the Problem

An aspect of a variable valve control device according to the present invention is configured to acquire control information including a first detection value, which is a detection value of a rotation phase based on a detection signal of an angular position of a crankshaft and a detection signal of an angular position of a camshaft, via a communication network, compute a second detection value, which is a detection value of the rotation phase, based on a motor angle signal, and switch the detection value of the rotation phase to be used for controlling a motor between the first detection value and the second detection value according to the operating conditions of an internal combustion engine.

An aspect of a variable valve control system of the present invention includes the variable valve control device, and an electronic control device configured to transmit the control information to the variable valve control device, the electronic control device computing the first detection value based on a crank angle signal and a cam angle signal, computing a command value, and transmitting control information including the first detection value and the command value to the variable valve control device via the communication network.

According to an aspect of a method for controlling a variable valve mechanism of the present invention, a first electronic control device computes a first detection value, which is a detection value of a rotation phase, based on a crank angle signal and a cam angle signal and transmits control information including the first detection value to a second electronic control device via a communication network, whereas the second electronic control device computes a second detection value, which is a detection value of the rotation phase based on a motor angle signal, which is an output signal from a motor angle sensor configured to detect an angle of rotation of a motor, controls the motor based on the second detection value when an internal combustion engine is in a transient state, and controls the motor based on the first detection value received via the communication network when the internal combustion engine is in a steady state.

Effects of the Invention

According to the invention described above, sufficient controllability with a simple configuration is achieved.

MODE FOR CARRYING OUT THE INVENTION

An embodiment of the present invention will be described below.

Figure 1:
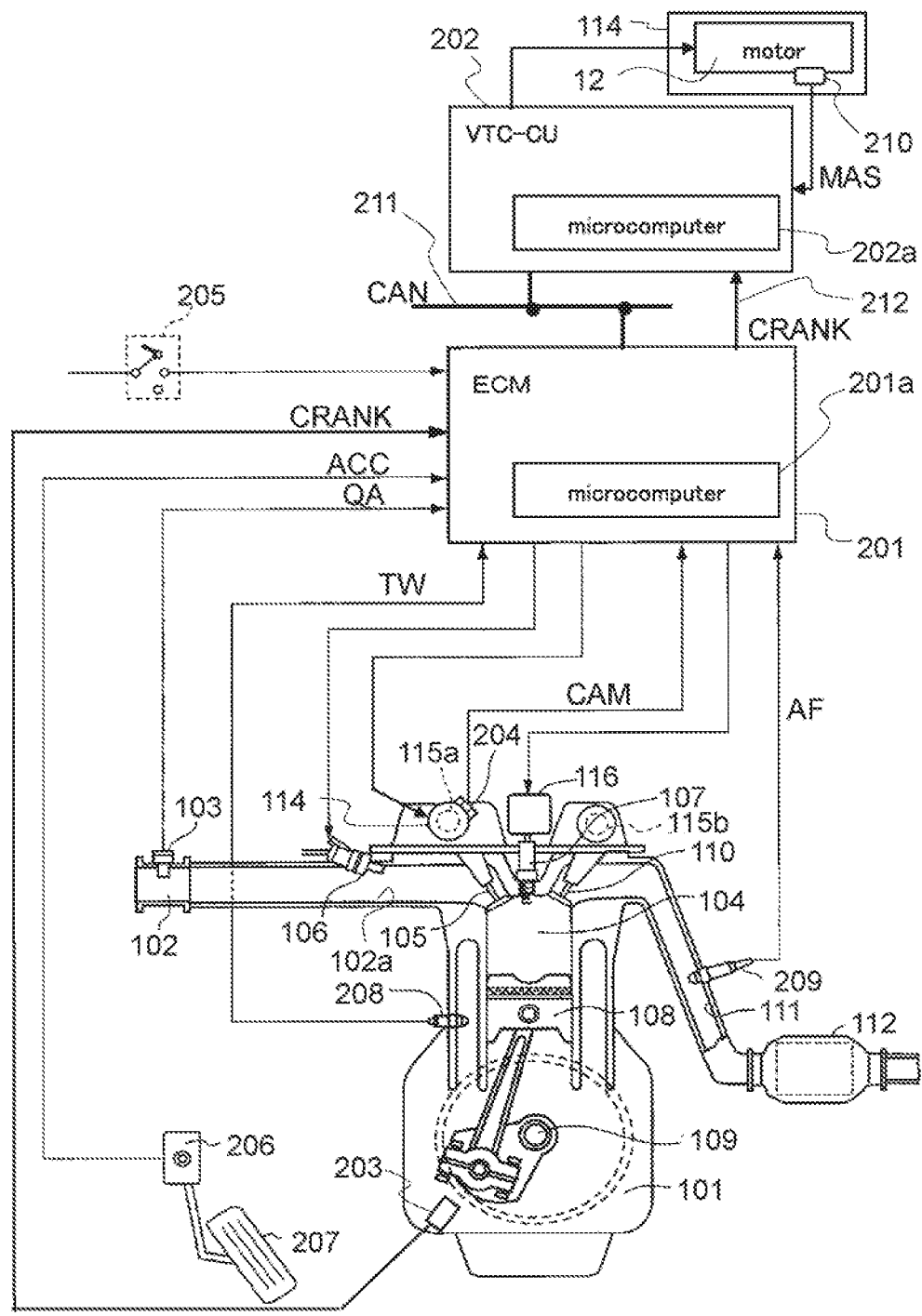
FIG. 1 is a system diagram of an internal combustion engine according to an embodiment of the present invention.

FIG. 1 illustrates an aspect of an internal combustion engine to which a variable valve control device, a variable valve control system and a method for controlling a variable valve mechanism according to the present invention are applied.

An internal combustion engine 101 illustrated in FIG. 1 is a spark-ignition gasoline engine, and is an internal combustion engine for a vehicle (not shown), to be mounted in the vehicle, as a drive source.

However, internal combustion engine 101 is not limited to the spark-ignition gasoline engine, and may be, for example, a compression-ignition gasoline engine, and furthermore, the drive source of the vehicle is not limited to an engine and, internal combustion engine 101 may be an internal combustion engine to be mounted in the vehicle as a power source for power generation.

An intake air mass sensor 103 disposed in an air intake duct 102 of internal combustion engine 101 detects an intake air mass of internal combustion engine 101 and outputs an intake air mass signal QA.

A fuel injection valve 106 is disposed at an air-intake port 102a of each cylinder, and fuel is injected into air-intake port 102a of each cylinder.

It should be noted that internal combustion engine 101 may include fuel injection valve 106 configured to inject the fuel directly into a combustion chamber 104.

The fuel injected into air-intake port 102a from fuel injection valve 106 is drawn together with air into combustion chamber 104 via an intake valve 105 when a piston 108 moves toward a bottom dead center, and air-fuel mixture in combustion chamber 104 is compressed when piston 108 rises to a top dead center.

When the air-fuel mixture is ignited by an ignition plug 107 by a spark and combusts, combustion gas expands to push piston 108 downward to the bottom dead center, and then the combustion gas is pushed out to an exhaust pipe 111 via an exhaust valve 110 by piston 108 rising by inertia.

A catalyst converter 112 provided with a three-way catalyst or the like is disposed in exhaust pipe 111.

Intake valve 105 opens in association with a rotation of an intake camshaft 115a driven to rotate by a crankshaft 109, and exhaust valve 110 opens in association with a rotation of an exhaust camshaft 115b driven to rotate by crankshaft 109.

A variable valve timing mechanism 114 is a variable valve mechanism capable of varying a rotation phase of intake camshaft 115a with respect to crankshaft 109 by transmitting the rotation of a motor 12 to intake camshaft 115a to continuously vary a valve timing of intake valve 105.

It should be noted that variable valve timing mechanism 114 has a known structure as disclosed in, for example, JP 2016-160840 A and JP 2017-075539 A, in which an angle of the rotation phase of intake camshaft 115a with respect to crankshaft 109 is varied to advance or delayed based on the difference in rotational speed between the rotational speed of crankshaft 109 and the rotational speed of motor 12.

Ignition plug 107 provided on each cylinder is provided directly with an ignition module 116 configured to supply ignition energy.

Ignition module 116 includes an ignition coil and a power transistor configured to control energization to the ignition coil.

A control system of internal combustion engine 101 includes an ECM (Engine Control Module) 201 configured to control fuel injection by fuel injection valve 106 and igniting operation by ignition module 116 and a VTC control unit 202 configured to control motor 12 of variable valve timing mechanism 114 by PWM control or the like.

ECM 201 is a first electronic control device including a microcomputer 201a and configured to control combustion of internal combustion engine 101, and computes and outputs amounts of operation of various devices such as fuel injection valve 106 and ignition module 116 by performing computing process according to a program stored in a memory.

VTC control unit 202, which is a variable valve control device, is a second electronic control device provided with a microcomputer 202a, and computes and outputs an amount of operation of variable valve timing mechanism 114 by performing computing process according to a program stored in the memory.

ECM 201 and VTC control unit 202 are connected to a communication network 211 in the vehicle and are capable of communicating with each other.

It should be noted that communication network 211 includes, for example, a CAN (Controller Area Network).

ECM 201, not only receives, as an input, intake air mass signal QA, which is the output signal from intake air mass sensor 103, but also receives, as an input, a crank angle signal CRANK, which is an output signal from a crank angle sensor 203 configured to detect an angular position of crankshaft 109, an acceleration opening signal ACC, which is an output signal from an acceleration opening sensor 206 configured to detect a pressing amount of an acceleration pedal 207, a cam angle signal CAM, which is an output signal from a cam angle sensor 204 configured to detect an angular position of intake camshaft 115a, a water temperature signal TW, which is an output signal from a water temperature sensor 208 configured to detect a temperature of cooling water of internal combustion engine 101, and an air-fuel ratio signal AF, which is an output signal from an air-fuel ratio sensor 209 disposed in exhaust pipe 111 on an upstream side of catalyst converter 112 and configured to detect an air-fuel ratio based on an oxygen concentration in exhaust air, and in addition, receives, as an input, an on-off signal from an ignition switch 205, which is a main switch for operating and stopping internal combustion engine 101.

Variable valve timing mechanism 114 includes a motor angle sensor 210 configured to detect an angle of rotation of motor 12, and VTC control unit 202 receives, as an input, a motor angle signal MAS, which is an output signal from motor angle sensor 210 and receives, as an input, crank angle signal CRANK from crank angle sensor 203 via ECM 201.

ECM 201 receives, as an input, crank angle signal CRANK, copies input crank angle signal CRANK, and outputs copied crank angle signal CRANK to VTC control unit 202 via a CRANK signal line 212, which is a specific signal line.

Figure 2:
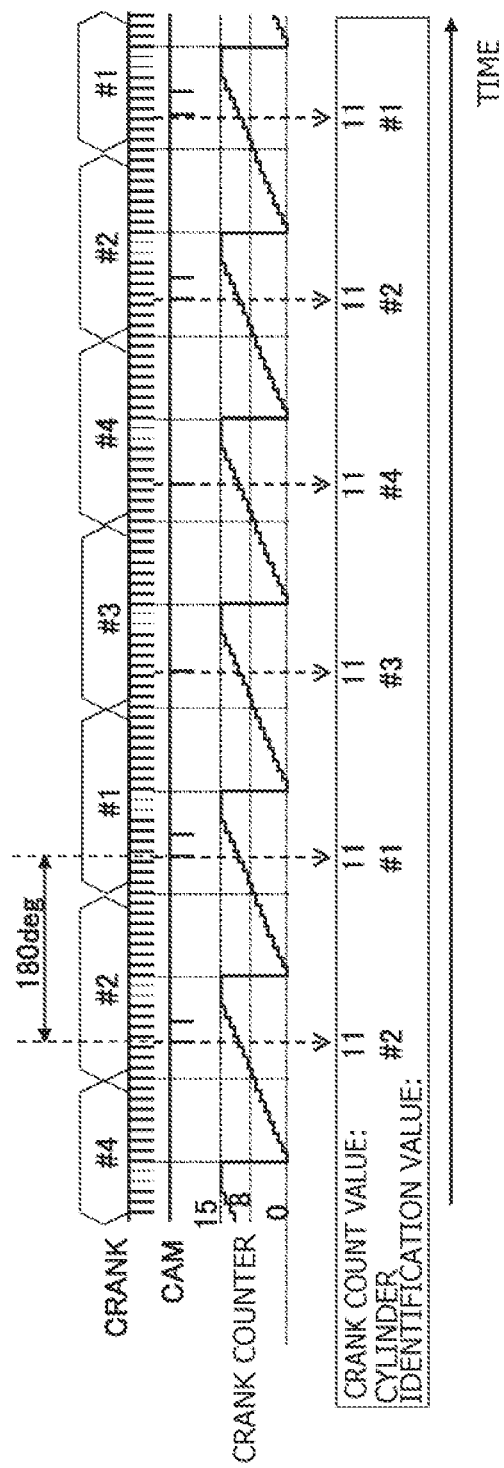
FIG. 2 is a time chart illustrating output patterns of a crank angle signal and a cam angle signal.

FIG. 2 is a time chart illustrating an aspect of output patterns of crank angle signal CRANK and cam angle signal CAM.

Crank angle signal CRANK of crank angle sensor 203 is a pulse signal emitted at every unit crank angle, and a signal output pattern is set so that one or a continuous plurality of pulses are missing at every crank angle corresponding to a stroke phase difference between cylinders.

The unit crank angle, which is an output cycle of crank angle signal CRANK, is, for example, a crank angle of 10 degrees, and the stroke phase difference between cylinders corresponds to ignition intervals, so that the crank angle is 180 degrees for an in-line four-cylinder engine.

It should be noted that crank angle sensor 203 may be configured to output crank angle signal CRANK at every unit crank angle without setting of missing point and a reference crank angle signal REF at every crank angle corresponding to the stroke phase difference between cylinders, respectively.

The missing point of crank angle signal CRANK or an output point of reference crank angle signal REF indicates that the piston of each cylinder is positioned at a reference piston position. In other words, the missing point of crank angle signal CRANK is used for detecting reference crank angle position instead of reference crank angle signal REF.

In contrast, cam angle sensor 204 outputs cam angle signal CAM at every crank angle corresponding to the stroke phase difference between cylinders.

Intake camshaft 115a rotates at half a speed of the rotational speed of crankshaft 109. Therefore, if internal combustion engine 101 is a four-cylinder engine and the crank angle corresponding to the stroke phase difference between cylinders is 180 degrees, the crank angle of 180 degrees corresponds to an angle of rotation of 90 degrees of intake camshaft 115a.

In other words, cam angle sensor 204 outputs cam angle signal CAM at every 90 degrees of rotation of intake camshaft 115a.

Cam angle signal CAM output from cam angle sensor 204 is a signal used by ECM 201 for detecting a cylinder which is positioned at the reference piston position (for example, at an air intake top dead center).

Therefore, for the four-cylinder engine, cam angle sensor 204 outputs cam angle signals CAM by a number which enables identification of a cylinder number at every crank angle of 180 degrees.

As an example, cam angle sensor 204 outputs one pulse signal, continuous two pulse signals, continuous two pulse signals, and one pulse signal in this order at every crank angle of 180 degrees as illustrated in FIG. 2.

ECM 201 detects which one of four cylinders is positioned at the reference piston position by counting the number of pulses of cam angle signal CAM in a count segment detected based on crank angle signal CRANK, specifies a cylinder to be controlled in fuel injection or ignition based on a result of detection, and controls fuel injection valve 106 and ignition module 116 from one cylinder to another.

In the example illustrated in FIG. 2, ECM 201 detects the missing point of crank angle signal CRANK based on a cycle of crank angle signal CRANK, counts the number of pulses of crank angle signal CRANK with reference to the missing point and, assuming that a timing when the result of counting reaches a preset value (preset value=11) is defined as a boundary of the count segment for counting the number of pulses of cam angle signal CAM, specifies a cylinder positioned at the reference piston position based on cam angle signal CAM subjected to counting from a previous boundary to a boundary of this time.

It should be noted that a set pattern of the number of pulses of cam angle signal CAM is not limited to a pattern illustrated in FIG. 2.

In addition, the signal output pattern of cam angle sensor 204 can be set so that ECM 201 can determine a cylinder at the reference piston position based on a difference in pulse width or amplitude of cam angle signal CAM.

VTC control unit 202 has a function as a control part for variably control the rotation phase of intake camshaft 115a with respect to crankshaft 109 by controlling the rotation of motor 12 of variable valve timing mechanism 114 in the form of software.

VTC control unit 202 performs a feedback control of the rotation phase in a drive control of motor 12 to control motor 12 so that a phase detection value RA, which is a detection value of the rotation phase of intake camshaft 115a with respect to crankshaft 109, gets closer to a target value TA as a command value.

ECM 201 here has a function as a command value computing part configured to compute target value TA based on engine operating conditions such as an engine load, an engine speed, an engine temperature and the like in the form of software. Furthermore, ECM 201 has a function as a first detection value computing part configured to compute a phase detection value RA1 as a first detection value of the rotation phase based on crank angle signal CRANK and cam angle signal CAM in the form of software.

ECM 201 transmits control information on variable valve timing mechanism 114 including target value TA and phase detection value RA1 to VTC control unit 202 via communication network 211.

In contrast, VTC control unit 202 receives, as inputs, crank angle signal CRANK and motor angle signal MAS, which is the output signal from motor angle sensor 210. VTC control unit 202 has a function as a second detection value computing part configured to compute a phase detection value RA2 as a second detection value of the rotation phase at every fixed computation cycle based on crank angle signal CRANK and motor angle signal MAS, and calibrate phase detection value RA2 based on phase detection value RA1 transmitted from ECM 201 in the form of software.

It should be noted that the computation cycle of phase detection value RA2 is set to be shorter than the computation cycle of phase detection value RA1 in a low rotation range of internal combustion engine 101.

VTC control unit 202 then switches phase detection value RA used for controlling variable valve timing mechanism 114 to either one of phase detection value RA1 and phase detection value RA2 based on the operating conditions of internal combustion engine 101, and computes and outputs an amount of operation of motor 12 so that phase detection value RA selected in the process of switching gets closer to target value TA.

VTC control unit 202 computes the rotational speed of motor 12 based on motor angle signal MAS and computes the rotational speed of crankshaft 109, in other words, an engine speed NE based on crank angle signal CRANK.

VTC control unit 202 then computes an amount of variation dRA in rotation phase per computation cycle based on the rotational speed of motor 12, the rotational speed of crankshaft 109, and a speed reduction ratio of the motor rotation in variable valve timing mechanism 114, and furthermore, integrates amount of variation dRA to obtain phase detection value RA2.

Figure 3:
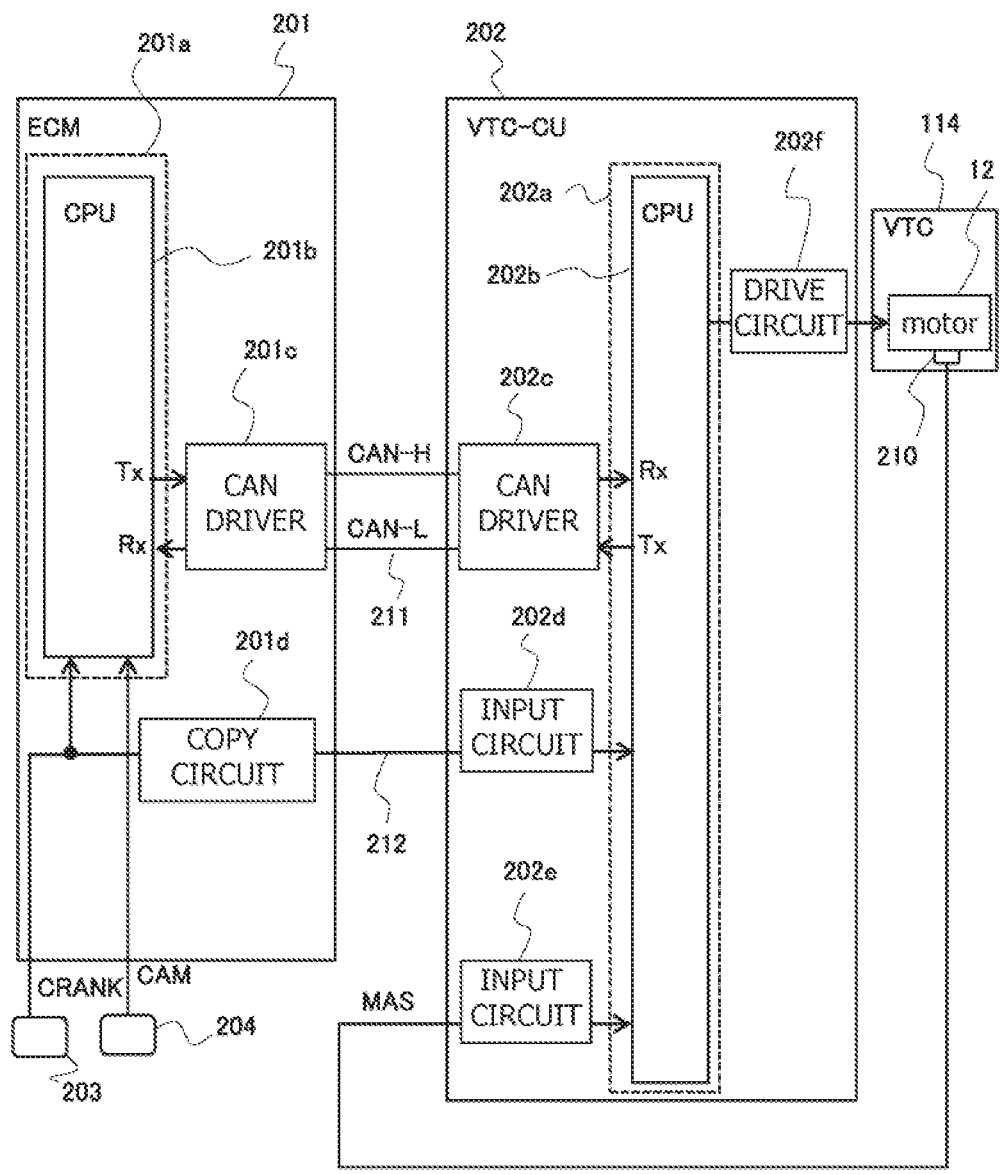
FIG. 3 is a block diagram illustrating hardware of a control system in a variable valve timing mechanism.

FIG. 3 illustrates a hardware configuration of the variable valve control system including ECM 201 and VTC control unit 202.

A CPU (Central Processing Unit) 201b of microcomputer 201a of ECM 201 receives, as inputs, crank angle signal CRANK from crank angle sensor 203 and cam angle signal CAM from cam angle sensor 204 and, based on these inputs, computes phase detection value RA1, which is an absolute phase angle.

CPU 201b specifies crank angle signal CRANK corresponding to the reference crank angle position, for example, by detecting the missing point of crank angle signal CRANK, and computes phase detection value RA1 of intake camshaft 115a with respect to crankshaft 109 at every input of cam angle signal CAM by measuring the crank angle (degrees) from the reference crank angle position until cam angle signal CAM is input.

In measurement of the crank angle (degrees) from the reference crank angle position until cam angle signal CAM is input, CPU 201b performs a process of counting the number of inputs of crank angle signal CRANK or a process of converting a result of measurement of elapsed time into the crank angle based on engine speed NE (rpm).

CPU 201b also receives, as inputs, signals such as intake air mass signal QA. CPU 201b then computes target value TA, which is a motor control command value of variable valve timing mechanism 114, in other words, a target valve timing based on data of engine speed NE computed based on crank angle signal CRANK or data of intake air mass indicated by intake air mass signal QA.

Furthermore, CPU 201b transmits control information including phase detection value RA1, target value TA, and engine speed NE to VTC control unit 202 by a CAN driver 201c connected to communication network 211.

CAN driver 201c is a communication part composed of a transceiver IC and the like.

Here, phase detection value RA1 is detected at every input of cam angle signal CAM as described above. CPU 201b then transmits a latest value of phase detection value RA1 to VTC control unit 202 every time when phase detection value RA1 is detected, in other words, at every input of cam angle signal CAM.

In other words, ECM 201 transmits phase detection value RA1 to VTC control unit 202 not as fixed time output at every fixed time period, but by a so-called "event transmission".

VTC control unit 202 includes a CAN driver 202c connected to communication network 211. CAN driver 202c is a communication part composed of transceiver IC.

CPU 202b of microcomputer 202a of VTC control unit 202 acquires information on phase detection value RA1 and target value TA transmitted from ECM 201 via CAN driver 202c.

ECM 201 includes a copy circuit 201d configured to copy crank angle signal CRANK. Copy circuit 201d outputs copied crank angle signal CRANK to VTC control unit 202 via CRANK signal line 212.

VTC control unit 202 includes an input circuit 202d for receiving, as an input, crank angle signal CRANK, and CPU 202b acquires crank angle signal CRANK, which is a copied signal transmitted from ECM 201 via CRANK signal line 212 and input circuit 202d.

VTC control unit 202 includes an input circuit 202e for receiving, as an input, motor angle signal MAS. CPU 202b then acquires motor angle signal MAS output from motor angle sensor 210 via input circuit 202e as a motor angle signal input part.

In addition, VTC control unit 202 includes a drive circuit 202f of motor 12 of variable valve timing mechanism 114. CPU 202b outputs a drive control signal to drive circuit 202f and controls the rotation of motor 12.

A process of switching and setting phase detection value RA used for the motor control and a process of calibrating phase detection value RA2 to be performed by CPU 202b of VTC control unit 202 will now be described according to a flowchart in FIG. 4.

Figure 4:
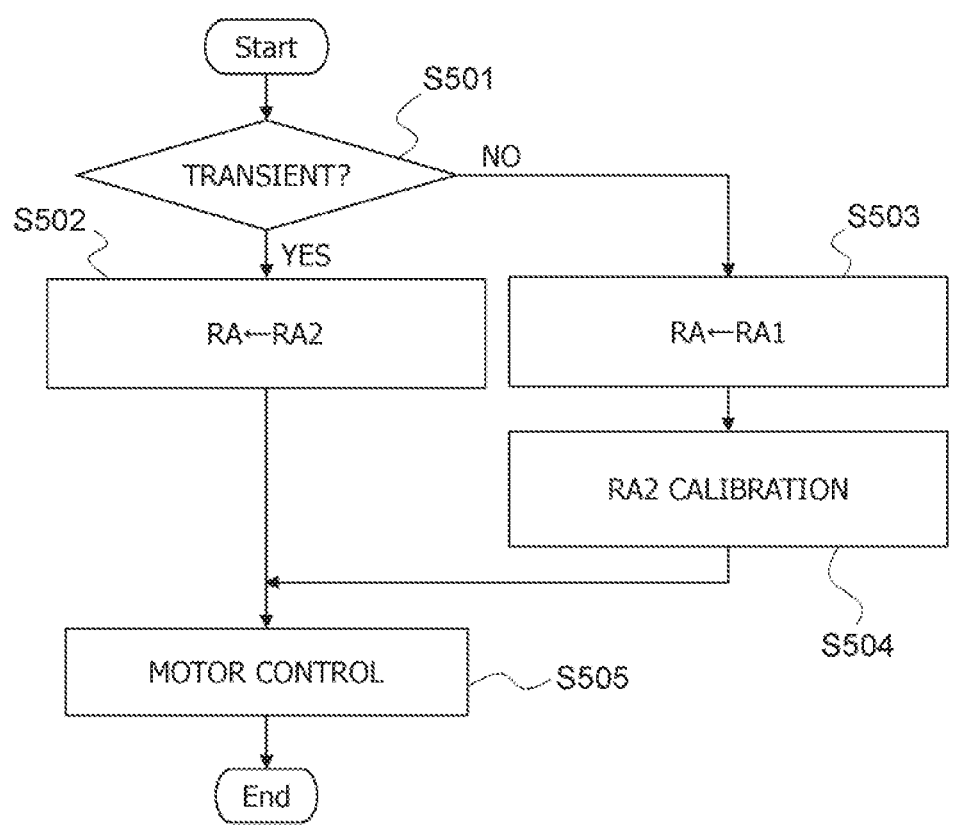
FIG. 4 is a flowchart illustrating a process of switching a phase detection value in the control system.

It should be noted that CPU 202b of VTC control unit 202 has a function as a switching part configured to switch and set phase detection value RA used for the motor control in the form of software as illustrated in the flowchart in FIG. 4.

CPU 202b determines whether internal combustion engine 101 is in the transient state or in the steady state in Step S501.

CPU 202b is capable of determining whether internal combustion engine 101 is in the transient state or in the steady state based, for example, on at least one of a variation in engine speed NE, a variation in target value TA transmitted from ECM 201, a variation in phase detection value RA1, a variation in phase detection value RA2, and a deviation between phase detection value RA1 or phase detection value RA2 and target value TA.

In other words, CPU 202b determines that internal combustion engine 101 is in the steady state if the absolute value of an amount of variation $\Delta TA$ in target value TA in a predetermined period is smaller than a first threshold value SL1. In contrast, CPU 202b determines that internal combustion engine 101 is in the transient state if the absolute value of amount of variation $\Delta TA$ in target value TA in the predetermined period is equal to or greater than first threshold value SL1.

In addition, CPU 202b determines that internal combustion engine 101 is in the steady state if the absolute value of an amount of variation $\Delta NE$ in engine speed NE in a predetermined period is less than a second threshold value SL2. In contrast, CPU 202b determines that internal combustion engine 101 is in the transient state if the absolute value of amount of variation $\Delta NE$ in engine speed NE in the predetermined period is equal to or greater than second threshold value SL2.

CPU 202b also determines that internal combustion engine 101 is in the steady state if an absolute value of an amount of variation $\Delta RA$ of phase detection value RA1 or phase detection value RA2 in a predetermined period is less than a third threshold value SL3. In contrast, CPU 202b also determines that internal combustion engine 101 is in the transient state if the absolute value of amount of variation $\Delta RA$ of phase detection value RA1 or phase detection value RA2 in the predetermined period is equal to or greater than third threshold value SL3.

CPU 202b is also capable of determining whether internal combustion engine 101 is in the transient state or in the steady state based, for example, on amount of variation ΔRA of phase detection value RA1 or phase detection value RA2 and amount of variation ΔNE in engine speed NE.

CPU 202b is also capable of determining whether internal combustion engine 101 is in the transient state or in the steady state based on amount of variation ΔRA of phase detection value RA1 or phase detection value RA2 and amount of variation ΔTA of target value TA.

CPU 202b is also capable of determining whether internal combustion engine 101 is in the transient state or in the steady state based on a deviation between phase detection value RA1 or phase detection value RA2 and target value TA. In other words, CPU 202b may determine that internal combustion engine 101 is in the steady state if the absolute value of the deviation is smaller than the threshold value, or if the state in which the absolute value of the deviation is smaller than the threshold value continues for a predetermined time or more.

CPU 202b is also capable of determining whether internal combustion engine 101 is in the transient state or in the steady state based on at least one of amount of variation ΔRA of phase detection value RA1 or phase detection value RA2, amount of variation ΔNE in engine speed NE, and amount of variation ΔTA of target value TA, and the deviation.

In this manner, CPU 202b is capable of determining whether internal combustion engine 101 is in the transient state or in the steady state based on at least one of a variation in engine speed NE, a variation in target value TA (command value) transmitted from ECM 201, a variation in phase detection value RA1, a variation in phase detection value RA2, and a deviation between phase detection value RA1 or phase detection value RA2 and target value TA. In addition, CPU 202b is capable of switching an amount of state used for determination whether internal combustion engine 101 is in the transient state or in the steady state depending on the conditions.

When CPU 202b determines that internal combustion engine 101 is in the transient state, the procedure goes to Step S502, where phase detection value RA2 computed based on motor angle signal MAS is selected as phase detection value RA used in control of motor 12. It should be noted that phase detection value RA2 is a relative phase angle.

In contrast, when CPU 202b determines that internal combustion engine 101 is in the steady state, the procedure goes to Step S503, where phase detection value RA1 based on crank angle signal CRANK and cam angle signal CAM is selected as phase detection value RA used in control of motor 12. It should be noted that phase detection value RA1 is an absolute phase angle.

Alternatively, when internal combustion engine 101 is in the steady state, CPU 202b goes to Step S504 to calibrate phase detection value RA2 computed based on motor angle signal MAS by phase detection value RA1 based on crank angle signal CRANK and cam angle signal CAM.

In other words, CPU 202b sets a value of phase detection value RA1 to phase detection value RA2 at a timing when phase detection value RA1 is event-transmitted, in other words, makes phase detection value RA2 match with phase detection value RA1, and then updates phase detection value RA2 based on motor angle signal MAS.

Therefore, at a timing when phase detection value RA1 is event-transmitted, phase detection value RA1 matches phase detection value RA2, so that CPU 202b performs the motor control based substantially on phase detection value RA1 irrespective of whether internal combustion engine 101 is in the transient state or in the steady state.

CPU 202b is capable of computing an amount of variation in rotation phase based on motor angle signal MAS but is not capable of obtaining an absolute value of the rotation phase from motor angle signal MAS. Therefore, based on phase detection value RA1, which is the absolute value of the rotation phase, CPU 202b computes a subsequent variation in rotation phase based on motor angle signal MAS, and updates phase detection value RA2.

Accordingly, accuracy of phase detection value RA2 is maintained, so that the rotation phase can be controlled at a high degree of accuracy when CPU 202b controls motor 12 based on phase detection value RA2 in a state in which internal combustion engine 101 is in the transient state.

In a manner as described above, CPU 202b switches phase detection value RA used for controlling motor 12 to either phase detection value RA1 based on crank angle signal CRANK and cam angle signal CAM or phase detection value RA2 based on motor angle signal MAS depending on whether internal combustion engine 101 is in the transient state or in the steady state.

CPU 202b then proceeds to Step S505, compares phase detection value RA and target value TA acquired by communication with ECM 201, and controls the rotation of motor 12 of variable valve timing mechanism 114 so that phase detection value RA gets closer to target value TA, in other words, so that opening and closing timings of intake valve 105 get closer to target opening and closing timings.

With the configuration described above, sufficient controllability is achieved with a simple system configuration in which the copy circuit for a sensor signal is eliminated.

In other words, in the steady state of internal combustion engine 101 in which variation of target value TA is small, CPU 202b can control variable valve timing mechanism 114 with necessary and sufficient convergence and responsiveness through the motor control using phase detection value RA1 detected at every generation of cam angle signal CAM even when an update frequency of phase detection value RA used for the control of motor 12 is low.

It should be noted that phase detection value RA1 is detected every time when cam angle signal CAM is generated, and thus, a detection frequency of phase detection value RA1 varies depending on the rotational speed of internal combustion engine 101, that is, the higher the rotational speed of internal combustion engine 101, the shorter the detection cycle of phase detection value RA1 becomes, so that the detection frequency of phase detection value RA1 increases.

In contrast, in the transient state of internal combustion engine 101 in which variation of target value TA is significant, if the update frequency of phase detection value RA used for controlling motor 12 is low, CPU 202b erroneously determines control deviations so that generation of overshooting may result.

However, phase detection value RA2 based on motor angle signal MAS is computed at a cycle that enables a sufficient update frequency even in the low rotation range, so that the variation in rotation phase while phase detection value RA1 is detected is complemented in the low rotation range.

Therefore, CPU 202b is capable of controlling variable valve timing mechanism 114 with required and sufficient convergence and responsiveness even in the low rotation range in which the detection cycle of phase detection value RA1 is increased through the motor control using phase detection value RA2 when internal combustion engine 101 is in the transient state.

In addition, CPU 202b acquires phase detection value RA1 through communication with ECM 201, and hence a timing of acquisition of phase detection value RA1 is delayed from a timing of detection due to communication delay, so that deviation may occur between the actual rotation phase and phase detection value RA1.

However, since CPU 202b performs the motor control using phase detection value RA1 and also performs calibration of phase detection value RA2 by using phase detection value RA1 when internal combustion engine 101 is in the steady state in which the variation in target value TA is small and the variation in phase detection value RA1 is small, an impact of the communication delay on the control of the rotation phase can be sufficiently reduced.

Here, ECM 201 includes copy circuit 201d of crank angle signal CRANK as well as the copy circuit of cam angle signal CAM, while VTC control unit 202 includes input circuit 202d for receiving, as an input, the copied signal of crank angle signal CRANK as well as an input circuit for receiving, as an input, a copied signal of cam angle signal CAM, so that phase detection value RA1 can be computed even with VTC control unit 202.

In this control system, although generation of error in phase detection value RA1 used for the motor control due to the communication delay may be suppressed, the copy circuit and the input circuit are added compared with the control system illustrated in FIG. 3 and, in addition, a computing function of phase detection value RA1 is redundant, and thus, the control system of variable valve timing mechanism 114 is subject to increase in cost and size.

In contrast, with the control system in FIG. 3, the copy circuit and the input circuit for transmitting/receiving cam angle signal CAM are not necessary and, in addition, computing process of phase detection value RA1 by CPU 202b of VTC control unit 202 is not necessary, so that the control system with a reduced cost and in addition in a reduced size can be provided.

In addition, in CPU 202b of VTC control unit 202 in the control system in FIG. 3, crank angle signal CRANK is input, but cam angle signal CAM is not input. Therefore, compared with a case where both crank angle signal CRANK and cam angle signal CAM are to be input, measures for reducing noise or measures for EMC (Electro Magnetic Compatibility) of VTC control unit 202 may be reduced. Therefore, costs for production and costs for development of VTC control unit 202 as an elementary substance may be reduced, and also a risk of failure in VTC control unit 202 as an elementary substance may be reduced by reducing the number of components and the circuits.

In addition, in the control system in FIG. 3, CPU 202b of VTC control unit 202 uses phase detection value RA2 for the motor control when internal combustion engine 101 is in the transient state, uses phase detection value RA1 for the motor control, and calibrates phase detection value RA2 based on phase detection value RA1 when internal combustion engine 101 is in the steady state.

Therefore, lowering in controllability of motor 12 due to the communication delay of phase detection value RA1 is suppressed, and thus, the controllability substantially equivalent to that in the case in which CPU 202b of VTC control unit 202 performs computation of phase detection value RA1 is achieved.

In the control system in FIG. 3, ECM 201, VTC control unit 202 as well as other electronic control devices may be connected to communication network 211 used for communication between ECM 201 and VTC control unit 202.

However, a communication network specific for communication between ECM 201 and VTC control unit 202, that is, a local communication network in which ECM 201 and VTC control unit 202 are connected, and other electronic control devices are not connected may be employed as communication network 211.

In a control system using such communication network 211, a communication load in communication network 211 is suppressed, and thus, the communication delay is reduced, and thus, lowering of controllability due to the communication delay may further be suppressed compared with a case in which the electronic control devices other than ECM 201 and VTC control unit 202 are connected.

In addition, in the control system, ECM 201 transmits phase detection value RA1 to VTC control unit 202 in the event transmission performed every time when phase detection value RA1 is detected. However, the transmission method of phase detection value RA1 may be switched according to the rotational speed of internal combustion engine 101, in other words, the detection cycle of phase detection value RA1.

Figure 5:
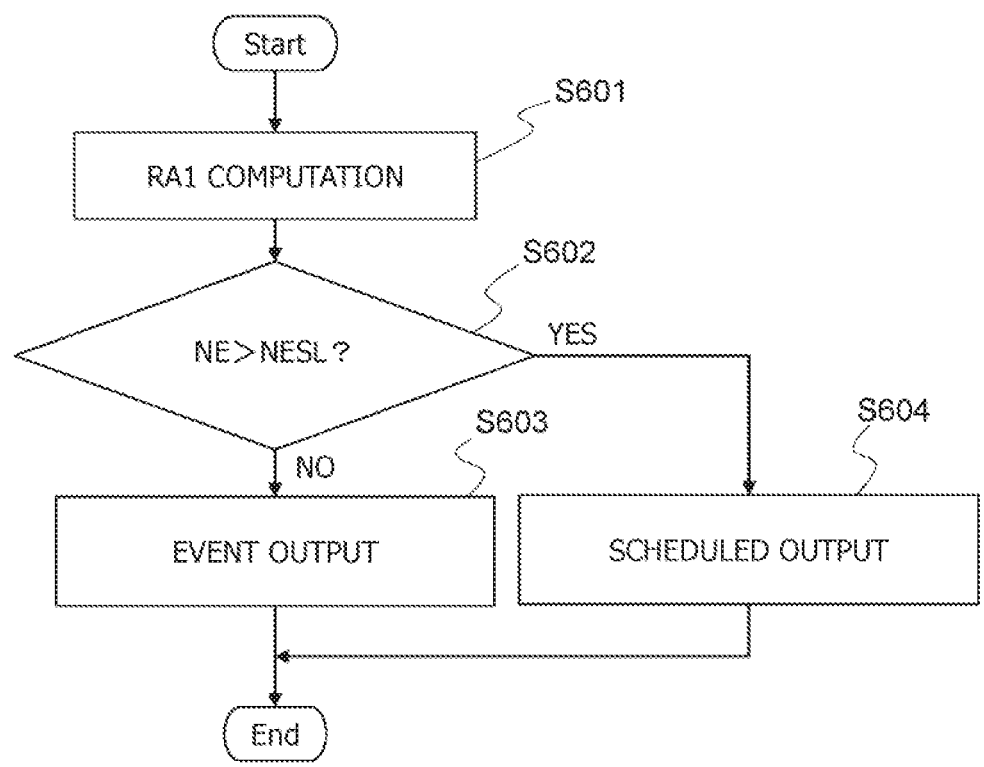
FIG. 5 is a flowchart illustrating a process of switching of a transmission method of a phase detection value RA1 in the control system.

A flowchart in FIG. 5 illustrates a process of switching the transmission method of phase detection value RA1 by CPU 201b of ECM 201, that is, a software machine as a transmission control part.

CPU 201b detects an angle from the reference crank angle position to a timing of generation of cam angle signal CAM as phase detection value RA1 every time when cam angle signal CAM is input in Step S601 (detecting part).

Subsequently, CPU 201b proceeds to Step S602 and onward, and performs a process of switching the transmitting state of phase detection value RA1 by CAN driver 201c between a first transmitting state in which phase detection value RA1 is transmitted at every detection cycle according to the detection cycle of phase detection value RA1 and the cycle of generation of cam angle signal CAM and a second transmitting state in which phase detection value RA1 is transmitted at every cycle longer than the detection cycle.

In other words, Step S602 to Step S604 described below correspond to the process of switching the transmission method.

First, CPU 201b performs determination of switching of the transmission method in Step S602. Specifically, CPU 201b determines whether or not the detection cycle of phase detection value RA1 is shorter than a predetermined time.

Here, the predetermined time in Step S602 corresponds to a control cycle of variable valve timing mechanism 114 in VTC control unit 202, in other words, to a computation cycle of a control duty of motor 12, and the control cycle is set to a fixed time period.

In contrast, the detection cycle of phase detection value RA1 corresponds to a generation cycle of cam angle signal CAM, and the detection cycle of phase detection value RA1 varies according to the rotational speed of internal combustion engine 101.

Therefore, CPU 201b is capable of determining whether or not actual engine speed NE is higher than an engine speed NESL at which the control cycle of motor 12 and the detection cycle of phase detection value RA1 match in Step S602.

In other words, determining whether or not the detection cycle of phase detection value RA1 is shorter than the control cycle of motor 12 and determining whether or not engine speed NE is higher than engine speed NESL both determine substantially the same conditions.

When the detection cycle of phase detection value RA1 is equal to or longer than the control cycle of motor 12, in other words, when NE≤NESL is satisfied, CPU 201b proceeds to Step S603.

Figure 6:
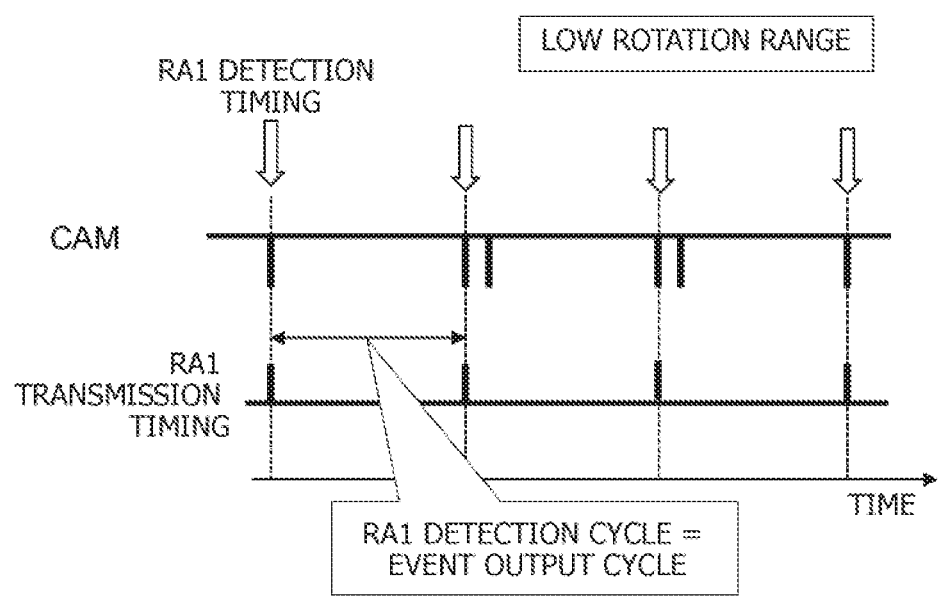
FIG. 6 is a time chart illustrating transmission timing in an event transmission of phase detection value RA1 in the control system.

In Step S603, CPU 201b performs setting for the event transmission of phase detection value RA1, in other words, selection of the first transmitting state, and transmits the latest value of phase detection value RA1 to VTC control unit 202 every time when cam angle signal CAM is generated and phase detection value RA1 is detected (see FIG. 6).

In contrast, when the detection cycle of phase detection value RA1 is shorter than the control cycle of motor 12, in other words, when NE>NESL is satisfied, CPU 201b proceeds to Step S604.

Figure 7:
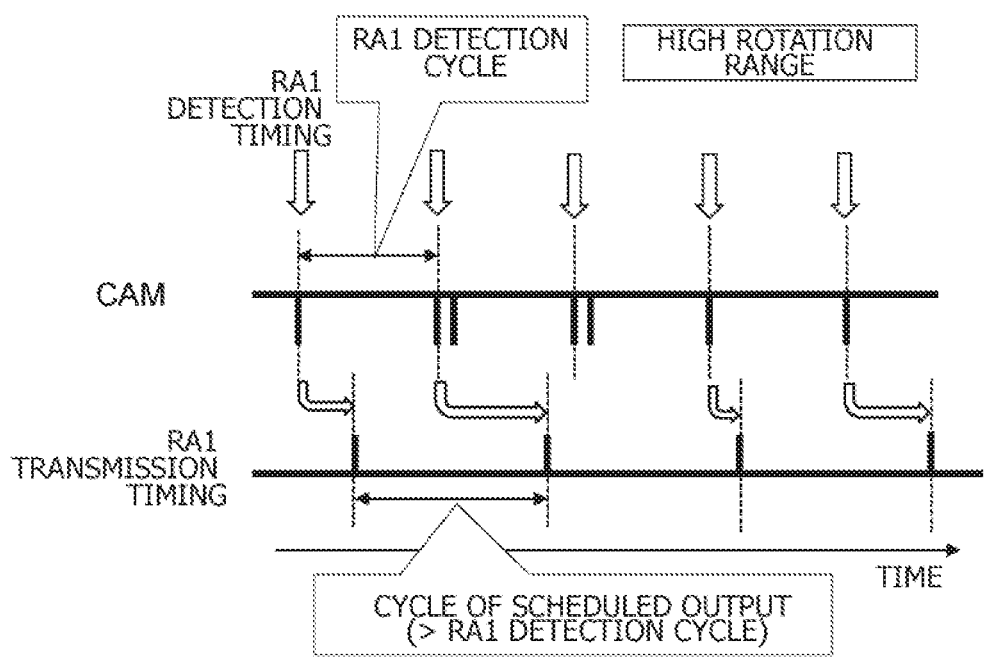
FIG. 7 is a time chart illustrating transmission timing in a fixed time output of phase detection value RA1 in the control system.

In Step S604, CPU 201b selects the scheduled transmission for transmitting phase detection value RA1 at a cycle longer than the transmission cycle of the event transmission, in other words, the second transmitting state, and transmits the latest value of phase detection value RA1 to VTC control unit 202 at the transmission timing at every fixed time period (see FIG. 7).

CPU 201b is capable of setting the cycle of the scheduled transmission to a time period equal to or shorter than the control cycle and longer than the detection cycle of phase detection value RA1, for example, setting the cycle of the scheduled transmission to match the control cycle when setting the scheduled transmission in Step S604.

Figure 8:
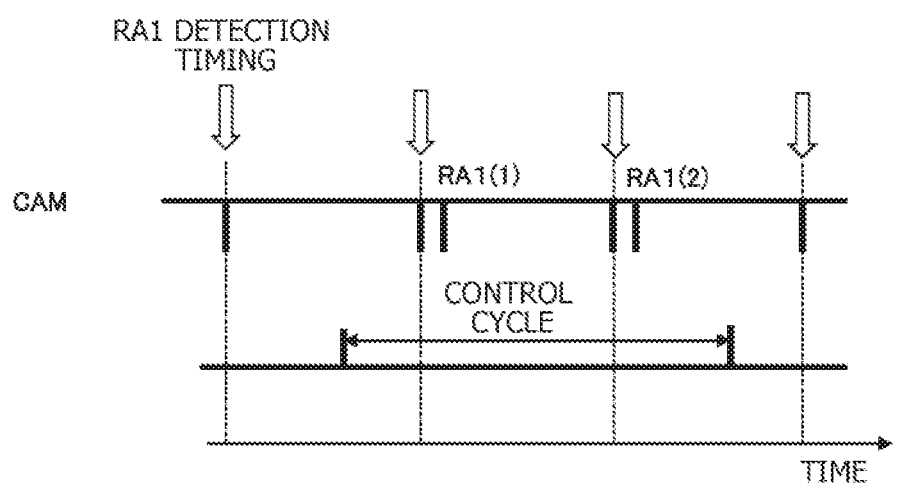
FIG. 8 is a time chart illustrating a correlation between a detection cycle and a control cycle of phase detection value RA1 in a high rotation range in the control system.

For example, as illustrated in FIG. 8, when phase detection value RA1 is detected twice per one control cycle, phase detection value RA1 actually used for the motor control is phase detection value RA1(2) detected immediately before the control timing, and phase detection value RA1 (1) detected before phase detection value RA1 (2) is not used for the phase control, so that the transmission of phase detection value RA1 (1) uselessly increases the communication load.

In order to suppress such a useless transmission of phase detection value RA1, CPU 201b switches the transmission from the event transmission to, for example, the scheduled transmission for transmitting phase detection value RA1 at a cycle matching the control cycle to prevent the increase in communication load in communication network 211 due to the useless transmission of phase detection value RA1 and increase in delay of transmission of phase detection value RA1 via communication network 211.

Figure 9:
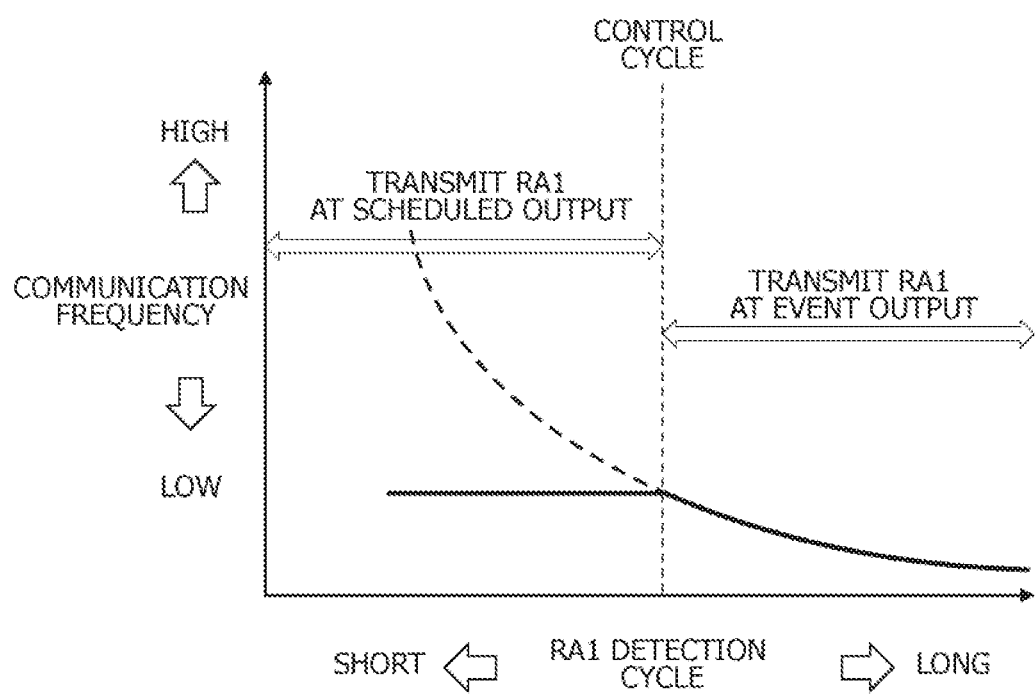
FIG. 9 is a line map illustrating a correlation between a detection cycle of phase detection value RA1 and a communication frequency in the control system.

FIG. 9 is a drawing illustrating a correlation between the detection cycle of phase detection value RA1 and the transmission cycle of phase detection value RA1.

As illustrated in FIG. 9, CPU 201b makes the event transmission active for transmitting every time when phase detection value RA1 is detected when the detection cycle of phase detection value RA1 is longer than the control cycle, and switches the transmission to the scheduled transmission for transmitting phase detection value RA1 at every control cycle to suppress the useless transmission of phase detection value RA1 and preventing increase in communication load when the detection cycle of phase detection value RA1 becomes shorter than the control cycle.

It should be noted that by making the scheduled transmission active for transmitting phase detection value RA1 at a cycle that matches the control cycle, the useless transmission of phase detection value RA1 can be reduced as much as possible while maintaining control accuracy. In contrast, by setting the scheduled transmission to be equal to or shorter than the control cycle and longer than the detection cycle of phase detection value RA1, the increase in communication load due to the useless transmission may be suppressed compared with the case of the event transmission.

Therefore, the cycle of the scheduled transmission under the conditions that the detection cycle of phase detection value RA1 is shorter than the control cycle should only be equal to or shorter than the control cycle and longer than the detection cycle of phase detection value RA1.

In addition, CPU 201b is capable of setting a transmission method in which the event transmission is thinned as a transmission method for reducing the increase in communication load due to the useless transmission of phase detection value RA1.

For example, as illustrated in FIG. 8, when phase detection value RA1 is detected twice per one control cycle, the control accuracy is not affected even when the transmission of phase detection value RA1 is performed once in two timings of detecting phase detection value RA1, which can reduce the communication load because the communication frequency is reduced and prevent the transmission delay time of phase detection value RA1 from increasing.

When switching to the transmission method in which execution of the event transmission is thinned, CPU 201b determines whether or not the detection cycle of phase detection value RA1 is shorter than half the control cycle to determine whether or not the condition that the transmission cycle of phase detection value RA1 is equal to or shorter than the control cycle is satisfied even when the event transmission is thinned in Step S602.

It should be noted that under the condition that the engine speed is high and phase detection value RA1 is detected three times per one control cycle, for example, CPU 201b transmits phase detection value RA1 once in three detection timings.

In other words, CPU 201b may set the transmission method in which the thinning of the event transmission is performed twice continuously and may set the thinned pattern so that the transmission cycle of phase detection value RA1 after thinning becomes equal to or shorter than the control cycle.

Figure 10:
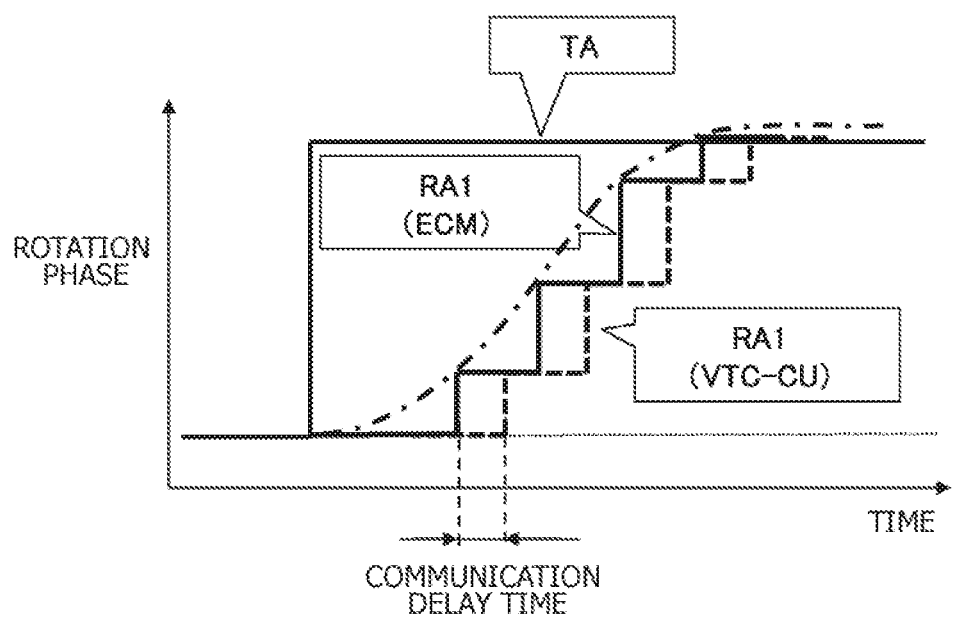
FIG. 10 is a time chart for explaining a state of generating a deviation in recognition values of the rotation phase due to a communication delay in the control system.

In the following description, a problem arising from the delay of transmission of phase detection value RA1 due to the increase in communication load will be described with reference to FIG. 10.

Since phase detection value RA1 is detected by CPU 201b at every cam angle signal CAM, and the higher the engine speed, the higher the frequency of event output becomes and the load of communication network 211 increases in the event transmission at every detection. When the load of communication network 211 is high, the communication delay is increased.

If the communication delay occurs in communication network 211 while phase detection value RA1 is varying, delay occurs from a timing when CPU 201b of ECM 201 detects phase detection value RA1 until VTC control unit 202 recognizes the detection value, and thus, the actual rotation phase is deviated from the rotation phase recognized by VTC control unit 202.

Therefore, the higher the load of communication network 211 as a result of increase in engine speed, the more the deviation between the actual rotation phase and the rotation phase recognized by VTC control unit 202 increases, so that the followability of the actual rotation phase with respect to a command value of the rotation phase is further lowered.

When the followability of the actual rotation phase with respect to the command value of the rotation phase is lowered, the motor control which essentially is not necessary is performed, thereby increasing power consumption in motor 12.

In contrast, when the transmission is set so that phase detection value RA1 is transmitted at a longer cycle than the transmission cycle of the event transmission when the detection cycle of phase detection value RA1 becomes shorter than the control cycle of motor 12, increase in communication load (communication delay) in association with increase in engine speed may be suppressed, and thus the lowering of the followability of the actual rotation phase with respect to the command value of the rotation phase and increase in power consumption of motor 12 may be prevented.

In the control system illustrated in FIG. 3, ECM 201 includes copy circuit 201d of crank angle signal CRANK, and VTC control unit 202 includes input circuit 202d of crank angle signal CRANK. However, a control system with copy circuit 201d and input circuit 202d omitted is also applicable.

Figure 11:
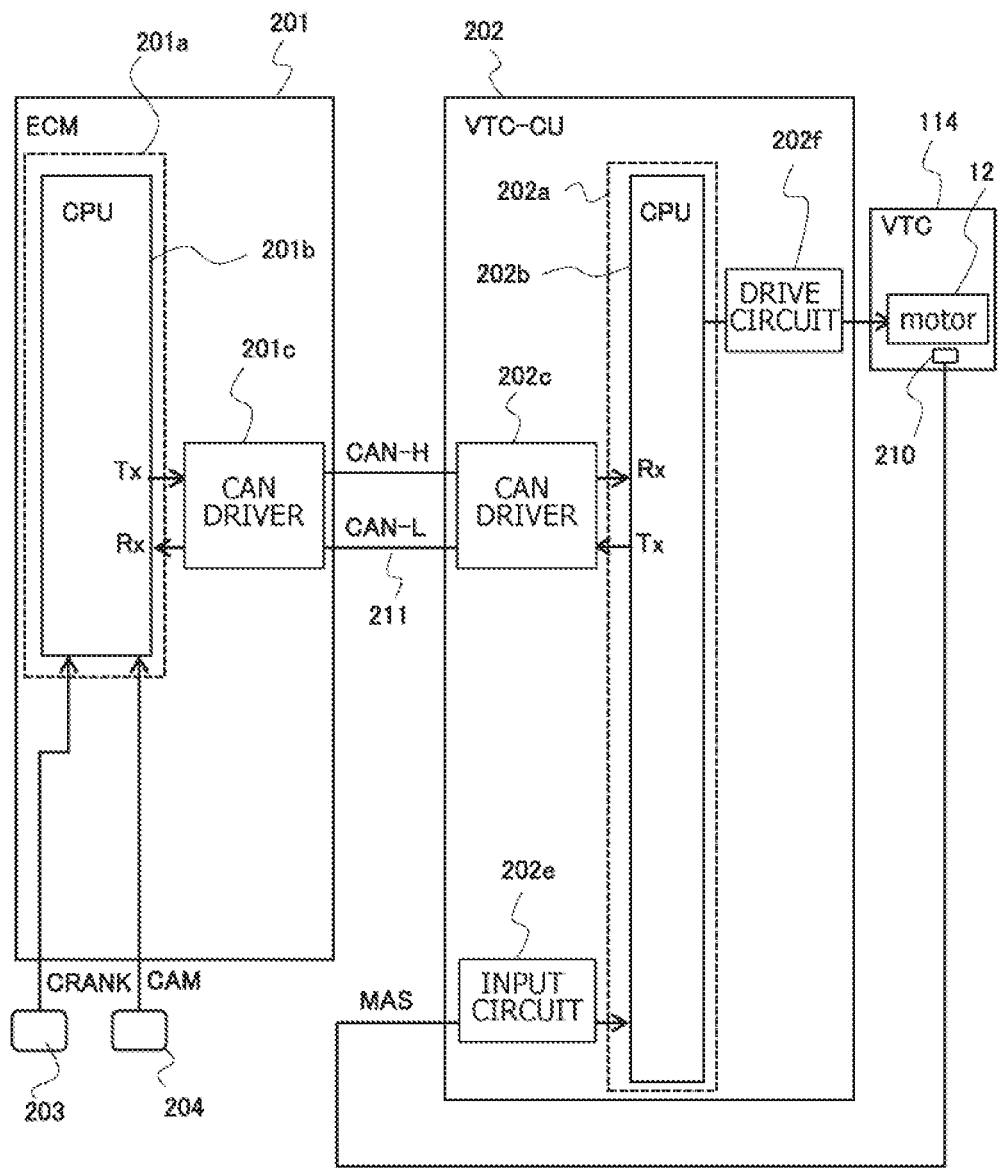
FIG. 11 is a block diagram illustrating hardware of the control system in which a copy circuit and an input circuit for the crank angle signal are omitted.

FIG. 11 illustrates the control system in which VTC control unit 202 does not receive, as inputs, crank angle signal CRANK and cam angle signal CAM but receives, as an input, motor angle signal MAS.

In the control system illustrated in FIG. 11, CPU 201b of ECM 201 transmits the control information including phase detection value RA1, target value TA, and engine speed NE to VTC control unit 202 by CAN driver 201c connected to communication network 211.

CPU 202b of VTC control unit 202 computes the rotational speed of motor 12 based on motor angle signal MAS, computes amount of variation dRA in rotation phase per computation cycle based on the rotational speed of motor 12 and engine speed NE transmitted from ECM 201, obtains phase detection value RA2 by integrating amount of variation dRA, and further, calibrates phase detection value RA2 based on phase detection value RA1 transmitted from ECM 201.

CPU 202b of VTC control unit 202 then performs the feedback control for motor 12 so that phase detection value RA2 gets closer to target value TA in the transient state of internal combustion engine 101, and performs the feedback control for motor 12 so that phase detection value RA1 gets closer to target value TA in the steady state of internal combustion engine 101.

It should be noted that CPU 202b of VTC control unit 202 is capable of computing a target motor speed (rpm) based on the control information including phase detection value RA1, target value TA, and engine speed NE transmitted from ECM 201, computing the rotational speed of motor 12 based on motor angle signal MAS, and performing the feedback control of motor 12 so that the rotational speed of motor 12 gets closer to the target motor speed.

Alternatively, such a configuration is also applicable in which CPU 201b of ECM 201 computes the target motor speed based on the control information such as phase detection value RA1, target value TA and engine speed NE and transmits the target motor speed to VTC control unit 202 via communication network 211, while CPU 202b of VTC control unit 202 computes the rotational speed of motor 12 based on motor angle signal MAS and performs the feedback control of motor 12 so that the motor speed gets closer to the target motor speed transmitted from ECM 201.

In the control system illustrated in FIG. 11, compared with the control system in FIG. 3, copy circuit 201d of crank angle signal CRANK, input circuit 202d of copied crank angle signal CRANK, and CRANK signal line 212 are omitted, and thus, reduction in cost and size of the control system can further be advanced, and a failure risk can further be reduced.

Figure 12:
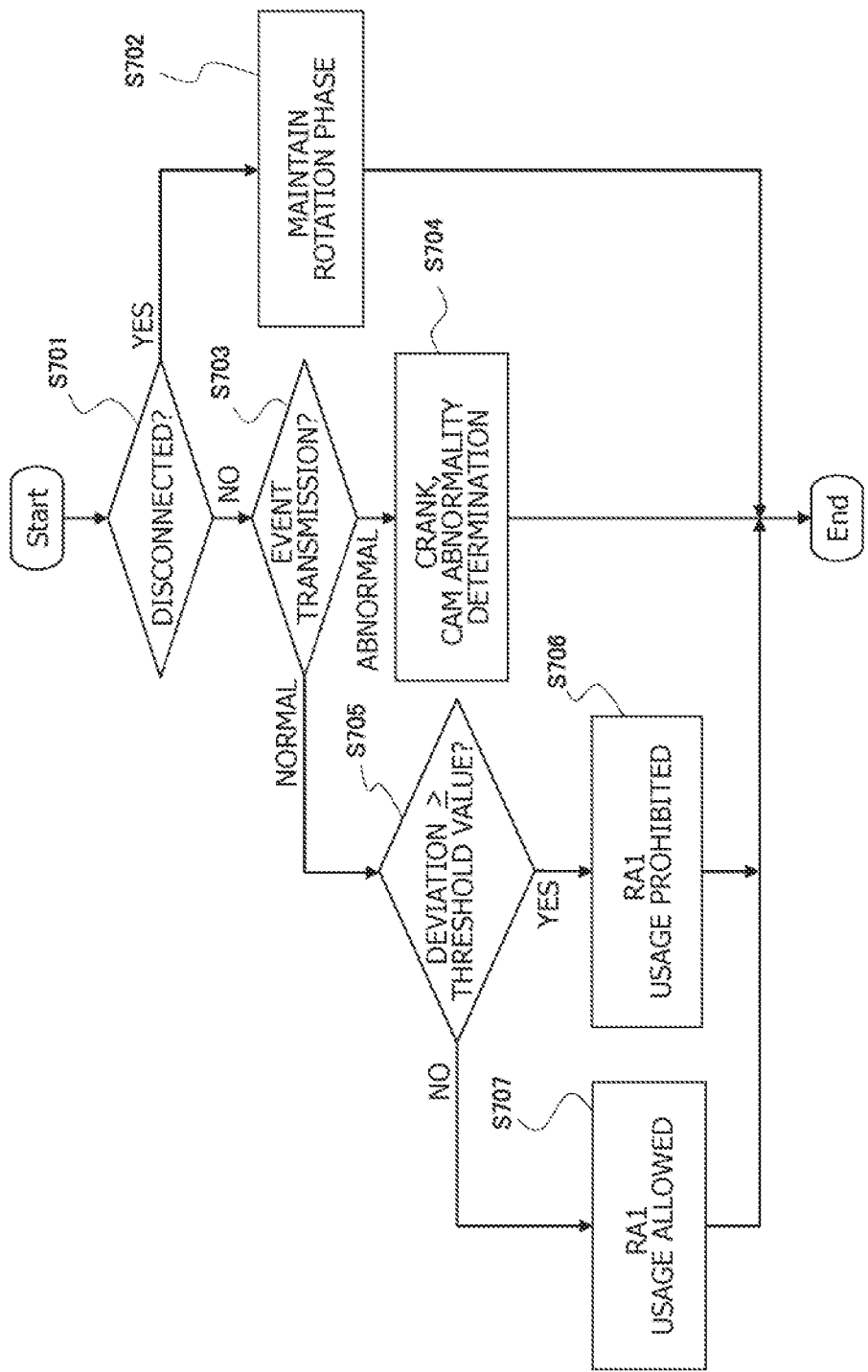
FIG. 12 is a flowchart illustrating a fail-safe process in the control system.

Subsequently, in the control system described above, a fail-safe process performed by CPU 202b of VTC control unit 202 will be described with reference to a flowchart in FIG. 12.

CPU 202b of VTC control unit 202 determines whether or not a CAN communication with respect to ECM 201 is disconnected in Step S701.

When the CAN communication with respect to ECM 201 is disconnected, that is, when the control information such as target value TA cannot be acquired from ECM 201, CPU 202b proceeds to Step S702 (first abnormality addressing part) and maintains the rotation phase at the value as-is, or controls and maintains the rotation phase to a prescribed position such as the most delayed angular position or the most advanced angular position determined mechanically by variable valve timing mechanism 114.

With such fail-safe process, ECM 201 can continue the control of internal combustion engine 101 by recognizing that variable valve timing mechanism 114 is controlled to the known rotation phase even in a state in which the communication with VTC control unit 202 is disconnected, so that lowering of operability of internal combustion engine 101 in a state in which the communication is disconnected is suppressed.

When the communication with ECM 201 is not disconnected, CPU 202b proceeds to Step S703 and determines whether or not the event transmission of phase detection value RA1 is lost for a predetermined time or more under the conditions in which phase detection value RA1 is event-transmitted.

The predetermined time here is set to a period that does not lose the event transmission of phase detection value RA1 even in the low rotation range of internal combustion engine 101.

Therefore, the state in which the event transmission of phase detection value RA1 is lost for the predetermined time or more corresponds to a state in which phase detection value RA1 is not detected at a normal cycle in ECM 201, and CPU 202b proceeds to Step S704 (second abnormality addressing part) to determine abnormality of crank angle signal CRANK of crank angle sensor 203 and/or cam angle signal CAM of cam angle sensor 204.

When CPU 202b determines an abnormal generation of crank angle signal CRANK and/or cam angle signal CAM, CPU 202b performs the fail-safe process such as a process of communicating information indicating the abnormal generation of crank angle signal CRANK and/or cam angle signal CAM toward ECM 201, a process of controlling the rotation phase to the known rotation phase, and the like.

It should be noted that performances of crank angle sensor 203 and cam angle sensor 204 for detecting abnormality can be improved by configuring ECM 201 to diagnose abnormality of crank angle sensor 203 and cam angle sensor 204 and VTC control unit 202 to observe the event transmission of phase detection value RA1.

In contrast, when the event transmission of phase detection value RA1 is performed at a normal cycle, CPU 202b proceeds to Step S705 and determines whether or not the deviation between phase detection value RA2 computed based on motor angle signal MAS, more specifically, a value before calibration based on phase detection value RA1 and phase detection value RA1 transmitted last time from ECM 201 is equal to or greater than the threshold value.

As described above, when the communication load in communication network 211 is increased, communication delay occurs between ECM 201 and VTC control unit 202, so that VTC control unit 202 calibrates phase detection value RA2 based on phase detection value RA1, thereby erroneously recognizing the actual rotation phase.

In other words, the more the communication delay increases between ECM 201 and VTC control unit 202, the greater the deviation between phase detection value RA2 computed by VTC control unit 202 based on motor angle signal MAS and phase detection value RA1 transmitted from ECM 201 to VTC control unit 202 becomes. Therefore, the deviation of phase detection value RA indicates the length of the communication delay time.

Accordingly, when the deviation between phase detection value RA2 and phase detection value RA1 is equal to or greater than the threshold value, CPU 202b determines that the communication delay time due to increase in communication load is increased beyond an allowable range and proceeds to Step S706 (third abnormality addressing part) to prohibit the motor control based on phase detection value RA1 and calibration of phase detection value RA2 based on phase detection value RA1.

Accordingly, VTC control unit 202 performs the motor control based on the rotation phase erroneously recognized due to the communication delay, so that lowering of followability to target value TA may be suppressed.

In contrast, when it is estimated that the deviation of phase detection value RA is smaller than the threshold value, and the communication delay time is within the allowable range, CPU 202b proceeds to Step S707, and performs the motor control based on phase detection value RA1 and calibration of phase detection value RA2 based on phase detection value RA1.

When it is assumed that the deviation of phase detection value RA is smaller than the threshold value and the communication delay is sufficiently small, CPU 202b resets accumulated errors of phase detection value RA2 based on motor angle signal MAS regularly by calibrating phase detection value RA2 based on phase detection value RA1, and realizing desirable followability with respect to target value TA in the motor control based on phase detection value RA2.

The present invention is not limited to the embodiment described above, and various modifications are included.

For example, the embodiment given above are described specifically for facilitating understanding of the present invention and is not necessarily limited to have all the configurations described.

Alternatively, it is possible to replace a part of the configuration of a certain embodiment with a configuration of another embodiment, and it is also possible to add a configuration of another embodiment to a configuration of a certain embodiment.

Furthermore, for a part of the configuration of each embodiment, another configuration may be added, removed, or replaced.

For example, drive circuit 202f of motor 12 may be provided on VTC control unit 202, and in addition, may also be provided outside VTC control unit 202.

Furthermore, variable valve timing mechanism 114 controlled by VTC control unit 202 is a variable valve mechanism capable of varying the rotation phase of intake camshaft 115a with respect to crankshaft 109 and continuously vary a valve timing of intake valve 105, but may be configured as a variable valve mechanism capable of varying the rotation phase of exhaust camshaft 115b with respect to crankshaft 109 and continuously vary the valve timing of exhaust valve 110.

Furthermore, in the determination of transient/steady in Step S501 of the flowchart in FIG. 4, CPU 202b is capable of detecting a state in which the amount of variation of phase detection value RA1 or phase detection value RA2 in the predetermined period is greater than a predetermined value as the transient state of internal combustion engine 101, and is capable of acquiring information on transition/steady detected by ECM 201 via communication network 211.

Still further, CPU 201b of ECM 201 observes the communication load in communication network 211 in the process of switching the transmission method of phase detection value RA1, switches the output from the event output to the fixed time output so that the communication load does not exceed a set level based on the allowable upper limit value, and/or sets the output cycle in the fixed time output.

In addition, the first electronic control device configured to compute phase detection value RA1 based on crank angle signal CRANK and cam angle signal CAM and transmit computed phase detection value RA1 via communication network 211 to VTC control unit 202 as the second electronic control device is not limited to the electronic control device having a function of controlling the fuel injection and ignition timing of internal combustion engine 101.

Furthermore, as communication network 211, a known network such as FlexRay (registered trademark) in addition to CAN can be used as needed.

REFERENCE SYMBOL LIST 12 motor
101 internal combustion engine
105 intake valve
109 crankshaft
114 variable valve timing mechanism (variable valve mechanism)
115a intake camshaft
201 ECM (first electronic control device)
202 VTC control unit (variable valve control device, second electronic control device)
203 crank angle sensor
204 cam angle sensor
210 motor angle sensor
211 communication network

The invention claimed is:

1. A variable valve control device applied to an internal combustion engine provided with a variable valve mechanism capable of varying a rotation phase of a camshaft with respect to a crankshaft by a rotation of a motor, and configured to control the motor based on a target value of the rotation phase, the variable valve control device comprising:
a motor angle signal acquisition part configured to acquire, as an input, a motor angle signal, which is an output signal from a motor angle sensor configured to detect an angle of rotation of the motor;
a crank angle signal acquisition part configured to acquire, as an input, a crank angle signal, which is an output signal from a crank angle sensor configured to detect an angular position of the crankshaft;
a communication part connected to an in-vehicle communication network and configured to acquire control information including a first detection value, which is a detection value of the rotation phase based on a detection signal of the angular position of the crankshaft and a detection signal of an angular position of the camshaft, and the target value, via the in-vehicle communication network;

a second detection value computing part configured to compute a second detection value, which is a detection value of the rotation phase, by computing an amount of variation in rotation phase per computation cycle based on a rotational speed of the motor computed based on the motor angle signal and a rotational speed of the crankshaft computed based on the crank angle signal and integrating the amount of variation;

a determination part configured to determine whether a rotation phase control for making the rotation phase approach the target value is in a transient state or in a steady state;

a switching part configured to switch a detection value of the rotation phase used for controlling the motor to the second detection value when the rotation phase control is in the transient state and switch the detection value of the rotation phase used for controlling the motor to the first detection value when the rotation phase control is in the steady state; and a control part configured to control the motor based on the target value and the detection value of the rotation phase switched by the switching part.

2. The variable valve control device according to claim 1, wherein the second detection value computing part calibrates the second detection value based on the first detection value at every acquisition of the first detection value and then updates the second detection value based on an integrated value of the amount of variation when the rotation phase control is in the steady state.

3. The variable valve control device according to claim 1, wherein the determination part determines whether the rotation phase control is in the transient state or in the steady state based on at least one of a variation in rotational speed of the internal combustion engine, a variation in the target value, a variation in the first detection value, a variation in the second detection value, and a deviation between the first detection value or the second detection value and the target value.

4. A variable valve control system comprising:
the variable valve control device according to claim 1; and
an electronic control device configured to transmit the control information to the variable valve control device, the electronic control device including:
a first detection value computing part configured to compute the first detection value based on the crank angle signal, which is an output signal from the crank angle sensor, and a cam angle signal, which is an output signal from a cam angle sensor configured to detect the angular position of the camshaft;
a command value computing part configured to compute the target value according to operating conditions of the internal combustion engine; and
a communication part connected to the in-vehicle communication network and configured to transmit control information including the first detection value and the target value to the variable valve control device via the in-vehicle communication network.

5. The variable valve control system according to claim 4, wherein the variable valve control device further comprises a first abnormality addressing part configured to maintain the rotation phase or control to a predetermined rotation phase when the communication with the electronic control device is disconnected.

6. The variable valve control system according to claim 4, wherein the communication part of the electronic control device transmits the first detection value to the variable valve control device every time when the first detection value is computed.

7. The variable valve control system according to claim 6, wherein the variable valve control device further comprises a second abnormality addressing part configured to detect a state in which at least one of the crank angle signal and the cam angle signal is abnormal when the communication with the electronic control device is not disconnected and the first detection value is not transmitted from the electronic control device for a predetermined time or longer.

8. The variable valve control system according to claim 4, wherein the communication part of the electronic control device varies a transmission timing of the first detection value according to a rotational speed of the internal combustion engine.

9. The variable valve control system according to claim 4, wherein the variable valve control device further comprises a third abnormality addressing part configured to stop the control of the motor based on the first detection value when a deviation between the second detection value and the first detection value transmitted from the electronic control device exceeds a predetermined value.

10. The variable valve control system according to claim 5, wherein the in-vehicle communication network connected with the communication part of the variable valve control device and the communication part of the electronic control device is a communication network to which only the variable valve control device and the electronic control device are connected.

11. A method for controlling a variable valve mechanism capable of varying a rotation phase of a camshaft with respect to a crankshaft of an internal combustion engine by a rotation of a motor by using a first electronic control device and a second electronic control device, wherein
the first electronic control device
acquires, as an input, a crank angle signal, which is an output signal from a crank angle sensor configured to detect an angular position of the crankshaft,
acquires, as an input, a cam angle signal, which is an output signal from a cam angle sensor configured to detect an angular position of the camshaft,
computes a first detection value, which is a detection value of the rotation phase based on the crank angle signal and the cam angle signal, and
transmits control information including the first detection value to the second electronic control device via an in-vehicle communication network;
the second electronic control device
receives the control information via the in-vehicle communication network,
acquires the crank angle signal,
acquires, as an input, a motor angle signal, which is an output signal of a motor angle sensor configured to detect an angle of rotation of the motor,
computes a second detection value, which is a detection value of the rotation phase, by computing an amount of variation in rotation phase per computation cycle based on a rotational speed of the motor computed based on the motor angle signal and a rotational speed of the crankshaft computed based on the crank angle signal and integrating the amount of variation,
determines whether a rotation phase control for making the rotation phase approach a target value is in a transient state or in a steady state, controls the motor based on the second detection value when the rotation phase control is in the transient state, and controls the motor based on the first detection value when the rotation phase control is in the steady state.

12. The method of controlling the variable valve mechanism according to claim 11, wherein the second electronic control device calibrates the second detection value based on the first detection value at every acquisition of the first detection value and then updates the second detection value based on an integrated value of the amount of variation when the rotation phase control is in the steady state.

* * * * *